United States Patent
Pua et al.

(10) Patent No.: US 7,822,912 B2
(45) Date of Patent: *Oct. 26, 2010

(54) FLASH STORAGE CHIP AND FLASH ARRAY STORAGE SYSTEM

(75) Inventors: Khein-Seng Pua, Hsinchu (TW);
Chih-Ling Wang, Hsinchu (TW);
Wee-Kuan Gan, Hsinchu (TW)

(73) Assignee: Phision Electronics Corp., Hsinchu (TW)

( * ) Notice: Subject to any disclaimer, the term of this patent is extended or adjusted under 35 U.S.C. 154(b) by 461 days.

This patent is subject to a terminal disclaimer.

(21) Appl. No.: 11/927,708

(22) Filed: Oct. 30, 2007

(65) Prior Publication Data

US 2008/0052451 A1    Feb. 28, 2008

Related U.S. Application Data

(63) Continuation-in-part of application No. 11/420,763, filed on May 28, 2006, now abandoned, and a continuation-in-part of application No. 11/747,235, filed on May 11, 2007, now Pat. No. 7,356,637, which is a continuation of application No. 10/906,934, filed on Mar. 14, 2005, now Pat. No. 7,225,289.

(51) Int. Cl.
*G06F 13/00* (2006.01)
*G06F 12/06* (2006.01)

(52) U.S. Cl. .................. 711/103; 710/315; 711/115; 711/154; 711/E12.008

(58) Field of Classification Search ................ None
See application file for complete search history.

(56) References Cited

U.S. PATENT DOCUMENTS

| | | | | |
|---|---|---|---|---|
| 5,509,134 | A * | 4/1996 | Fandrich et al. | 711/103 |
| 7,103,684 | B2 * | 9/2006 | Chen et al. | 710/62 |
| 7,130,958 | B2 * | 10/2006 | Chou et al. | 711/103 |
| 7,225,289 | B2 * | 5/2007 | Tee et al. | 710/315 |
| 2005/0133916 | A1 * | 6/2005 | Karnezos | 257/738 |

FOREIGN PATENT DOCUMENTS

| | | |
|---|---|---|
| CN | 1746870 | 3/2006 |
| CN | 1881165 | 12/2006 |
| CN | 1889065 | 1/2007 |

* cited by examiner

*Primary Examiner*—Reginald G Bragdon
*Assistant Examiner*—Eric Loonan
(74) *Attorney, Agent, or Firm*—Jianq Chyun IP Office

(57) ABSTRACT

A flash storage chip including a single circuit board, a microcontroller, a flash memory, and a peripheral component interconnect express (PCI Express) connecting interface is provided. The microcontroller, the flash memory, and the PCI Express connecting interface are embedded on the single circuit board, and the microcontroller has a flash memory interface and a PCI Express interface. When a host writes a data into the flash storage chip, the microcontroller receives the data though the PCI Express interface and stores the data into the flash memory though the flash memory interface. When the host reads a data form the flash storage chip, the microcontroller reads the data from the flash memory though the flash memory interface and transmits the data to the host though the PCI Express interface and the PCI Express connecting interface.

13 Claims, 6 Drawing Sheets

FIG. 5

| PIN | SIDE B TITLE | DESCRIPTION | SIDE A TITLE | DESCRIPTION |
|---|---|---|---|---|
| 1 | +12V | 12V POWER | PRSNT1# | HOT SWAP DETECTION |
| 2 | +12V | 12V POWER | +12V | 12V POWER |
| 3 | RSVD | RESERVED | +12V | 12V POWER |
| 4 | GND | GROUND | GND | GROUND |
| 5 | SMCLK | SYSTEM MANAGEMENT CLOCK | JTAG2 | TEST CLOCK, FOR CLOCK INPUT OF JTAG INTERFACE |
| 6 | SMDAT | SYSTEM MANAGEMENT DATA | JTAG3 | TEST DATA INPUT-TDI |
| 7 | GND | GROUND | JTAG4 | TEST DATA OUTPUT-TDO |
| 8 | +3.3V | 3.3V POWER | JTAG5 | TEST MODE SELECT-TMS |
| 9 | JTAG1 | TEST RESET, FOR RESETING JTAG INTERFACE | +3.3V | 3.3V POWER |
| 10 | +3.3Vaux | 3.3V AUXILIARY POWER | +3.3V | 3.3V POWER |
| 11 | WAKE# | FOR CONNECTING TO A RESTART SIGNAL | PERST# | BASIC RESET |
|  |  |  | key |  |
| 12 | RSVD | RESERVED | GND | GROUND |
| 13 | GND | GROUND | REFCLK+ | REFERENCE CLOCK (DIFFERENTIAL PAIR) |
| 14 | PETp0 | TRANSMITTER DIFFERENTIAL PAIR, CHANNEL 0 | REFCLK- |  |
| 15 | PETn0 |  | GND | GROUND |
| 16 | GND | GROUND | PERp0 | TRANSMITTER DIFFERENTIAL PAIR, CHANNEL 0 |
| 17 | PRSNT2# | HOT SWAP DETECTION | PERn0 |  |
| 18 | GND | GROUND | GND | GROUND |

FLASH STORAGE CHIP AND FLASH ARRAY STORAGE SYSTEM

CROSS-REFERENCE TO RELATED APPLICATION

This application is a continuation-in-part of a prior application Ser. No. 11/420,763, filed May 28, 2006 and now abandoned, and a continuation-in-part of a prior application Ser. No. 11/747,235, filed May 11, 2007 and now U.S. Pat. No. 7,356,637. The prior application Ser. No. 11/747,235 is a continuation of a prior application Ser. No. 10/906,934, filed on Mar. 14, 2005 and now U.S. Pat. No. 7,225,289. The entirety of each of the above-mentioned patent applications is hereby incorporated by reference herein and made a part of this specification.

BACKGROUND OF THE INVENTION

1. Field of the Invention

The present invention generally relates to a storage apparatus, in particular, to a flash storage chip and a flash array storage system.

2. Description of Related Art

Along with the advancement of semiconductor technology, the development of electronic products has been going towards high processing speed and multitasking. The processing speeds of logic processors such as a central processing unit (CPU) and memories in computer systems have been continuously improved as well.

However, besides being affected by the processing speeds of various logic processors and the memory, the performance of a computer system is also affected by the access speed of the storage device thereof (e.g. a hard disk). Because the access speed of a storage device is not likely to be considerably improved due to some technical obstacles, the access speed of the storage device cannot keep up with those of the CPU and the memory and accordingly the performance of the entire computer system cannot be effectively improved.

The data transmission rate of a computer system is mainly determined by the transmission speed of the bus. In order to improve the performance of a computer system, various interfaces with improved performance have been developed one after another, such as integrated device electronics (IDE) interface, peripheral component interconnect (PCI) interface, and PCI Express (PCIe) interface etc.

Additionally, a technique of redundant array of independent disks (RAID) has been provided to improve the access speed of the storage device in a computer system. According to the technique of RAID, a plurality of sub-storage devices is combined into a storage device. A data to be read from or written into a RAID is divided into a plurality of portions and then the various portions are read from or written into the sub-storage devices of the RAID simultaneously. Accordingly, RAID offers faster access speed. In addition, to avoid data loss when a particular physical hard disk is damaged, the concept of parity check is adopted by the RAID technique for restoring data when necessary.

However, the RAID technique described above has to use a plurality of hard disks therefore the volume of a RAID is very large and accordingly cannot be applied to a small computer system. Thereby, it is needed to develop a RAID system which can be applied to a small computer system.

SUMMARY OF THE INVENTION

Accordingly, the present invention is directed to a flash array storage system, wherein the flash array storage system has a small volume therefore can be applied to a small computer system.

The present invention is directed to a flash array storage system, wherein the flash array storage system has a small volume therefore can be applied to a small computer system, and the flash array storage system is compatible to an integrated device electronics (IDE) interface in a host system.

The present invention is directed to a flash storage chip, wherein the flash storage chip is packaged as a single chip so that the volume of an entire flash array storage system can be reduced and accordingly the flash array storage system can be applied to a small computer system.

The present invention is directed to a flash storage chip, wherein the flash storage chip is packaged as a single chip so that the volume of an entire flash array storage system can be reduced and accordingly the flash array storage system can be applied to a small computer system, and the flash storage chip is compatible to an IDE interface in a host system.

The present invention provides a flash array storage system including a plurality of flash storage chips, a flash array controller, and a data transmission interface. The flash storage chips are arranged as an array, wherein each flash storage chip includes a single circuit board, a microcontroller, at least one flash memory, and a peripheral component interconnect express (PCI Express) connecting interface. The microcontroller is embedded on the single circuit board and has a flash memory interface and a PCI Express interface. The flash memory is embedded on the single circuit board and is coupled to the microcontroller for storing data. The PCI Express connecting interface is embedded on the single circuit board and is coupled to the microcontroller. The flash array controller is coupled to the flash storage chips and controls the data access to the flash storage chips. The data transmission interface is coupled to the flash array controller for connecting to a host and transmitting instructions and data between the flash array storage system and the host. When the host writes a data to the flash array storage system, the flash array controller designates at least one of the flash storage chips to write the data, and the microcontroller of the designated flash storage chip receives the data through the PCI Express connecting interface and the PCI Express interface and writes the data into the flash memory through the flash memory interface. When the host reads a data from the flash array storage system, the flash array controller searches for the flash storage chip which stores the data, and the microcontroller of the flash storage chip which stores the data reads the data from the flash memory through the flash memory interface and transmits the data through the PCI Express interface and the PCI Express connecting interface.

According to an embodiment of the present invention, the flash memory in each of the flash storage chips is a single level cell (SLC) NAND flash memory or a multi level cell (MLC) NAND flash memory.

According to an embodiment of the present invention, the microcontroller and the flash memory in each of the flash storage chips are embedded on the single circuit board through quad flat no lead (QFN) packaging, land grid array (LGA) packaging, ball grid array (BGA) packaging, low profile quad flat packaging (LQFP), quad flat packaging (QFP), die packaging, chip on board (COB) packaging, or system in package (SIP).

According to an embodiment of the present invention, a transmitter Tx and a receiver Rx can be constituted by at least one simplex channel at the physical layer for data transmission between the flash storage chips and the flash array storage system.

The present invention provides a flash array storage system including a plurality of flash storage chips and a flash array driving program. The flash storage chips are arranged as an array, wherein each of the flash storage chips includes a single circuit board, a microcontroller, at least one flash memory, and a PCI Express connecting interface. The microcontroller is embedded on the single circuit board and has a flash memory interface, a PCI Express interface, and a virtual integrated device electronics (IDE) module. The virtual IDE module has an IDE master port for receiving an IDE instruction and an IDE device port for executing the IDE instruction, and the virtual IDE module can be implemented by a firmware which can be executed by the microcontroller. The flash memory is embedded on the single circuit board and is coupled to the microcontroller for storing data. The PCI Express connecting interface is embedded on the single circuit board and is coupled to the microcontroller for connecting to a host. The flash array driving program is installed in the host and is executed by host for controlling data access to the flash storage chips. When the host reads a data from the flash array storage system, the flash array driving program searches for a flash storage chip which stores the data, and the virtual IDE module of the flash storage chip which stores the data receives and executes the IDE instruction issued by the host, and the data is read through the flash memory interface and converted into formats acceptable to the PCI Express connecting interfaces through the PCI Express interfaces to be transmitted. When the host writes a data into the flash array storage system, the flash array driving program designates at least one of the flash storage chips to write the data, and the virtual IDE module of the designated flash storage chip receives and executes the IDE instruction issued by the host, and the data is received through the PCI Express connecting interface and the PCI Express interface and converted into formats acceptable to the flash memories by the flash memory interfaces to be written into the flash memories.

According to an embodiment of the present invention, the flash memory in each of the flash storage chips is a SLC NAND flash memory or a MLC NAND flash memory.

According to an embodiment of the present invention, the microcontroller and the flash memory in each of the flash storage chips are embedded on the single circuit board through QFN packaging, LGA packaging, BGA packaging, LQFP, QFP, die packaging, COB packaging, or SIP.

According to an embodiment of the present invention, the IDE instruction is compatible to the ATA specification or the serial ATA specification.

The present invention provides a flash storage chip including a single circuit board, a microcontroller, at least one flash memory, and a PCI Express connecting interface. The microcontroller is embedded on the single circuit board and has a flash memory interface and a PCI Express interface. The flash memory is embedded on the single circuit board and is coupled to the microcontroller for storing data. The PCI Express connecting interface is embedded on the single circuit board and is coupled to the microcontroller. When a host writes a data into the flash storage chip, the microcontroller receives the data through the PCI Express interface and writes the data into the flash memory through the flash memory interface. When the host reads a data from the flash storage chip, the microcontroller reads the data from the flash memory through the flash memory interface and transmits the data to the host through the PCI Express interface and the PCI Express connecting interface.

According to an embodiment of the present invention, the flash memory is a SLC NAND flash memory or a MLC NAND flash memory.

According to an embodiment of the present invention, the microcontroller and the flash memory are embedded on the single circuit board through QFN packaging, LGA packaging, BGA packaging, LQFP, QFP, die packaging, COB packaging, or SIP.

According to an embodiment of the present invention, the pins of the packaged flash storage chip include at least a PERST# pin, a REFCLK+ pin, a REFCLK− pin, a PETp0 pin, a PETn0 pin, a PERp0 pin, a PERn0 pin, a Power pin, and a Ground pin.

The present invention provides a flash storage chip including a single circuit board, a microcontroller, at least one flash memory, and a PCI Express connecting interface. The microcontroller is embedded on the single circuit board and has a flash memory interface, a PCI Express interface, and a virtual IDE module. The virtual IDE module has an IDE master port for receiving an IDE instruction and an IDE device port for executing the IDE instruction, and the virtual IDE module can be implemented by a firmware which can be executed by the microcontroller. The flash memory is embedded on the single circuit board and is coupled to the microcontroller for storing data. The PCI Express connecting interface is embedded on the single circuit board and is coupled to the microcontroller. When a host reads a data from the flash memory, the IDE instruction issued by the host is transmitted to the virtual IDE module to be executed, and the data is read from the flash memory through the flash memory interface and converted into a format acceptable to the PCI Express connecting interface through the PCI Express interface to be transmitted to the host. When the host writes a data into the flash memory, and the IDE instruction issued by the host is transmitted to the virtual IDE module to be executed by the virtual IDE module, and the data is received through the PCI Express interface and converted into a format acceptable to the flash memory through the flash memory interface to be written into the flash memory.

According to an embodiment of the present invention, the flash memory is a SLC NAND flash memory or a MLC NAND flash memory.

According to an embodiment of the present invention, the microcontroller and the flash memory are embedded on the single circuit board through QFN packaging, LGA packaging, BGA packaging, LQFP, QFP, die packaging, COB packaging, or SIP.

According to an embodiment of the present invention, the IDE instruction is compatible to the ATA specification or the serial ATA specification.

The present invention provides a flash storage chip including a single circuit board, a microcontroller, a plurality of flash memories, and a PCI Express connecting interface. The microcontroller is embedded on the single circuit board and has a flash memory interface and a PCI Express interface. The flash memories are embedded on the single circuit board and are coupled to the microcontroller for storing data. The PCI Express connecting interface is embedded on the single circuit board and is coupled to the microcontroller. When a host writes a data into the flash storage chip, the microcontroller receives the data through the PCI Express interface and writes the data into the flash memories through the flash memory interface. When the host reads a data from the flash storage chip, the microcontroller reads the data from the flash memories through the flash memory interface and transmits the data to the host through the PCI Express interface and the PCI Express connecting interface. The data is read from or written into the flash memories in a parallel manner.

According to an embodiment of the present invention, the flash memory is a SLC NAND flash memory or a MLC NAND flash memory.

According to an embodiment of the present invention, the microcontroller and the flash memories are embedded on the single circuit board through QFN packaging, LGA packaging, BGA packaging, LQFP, QFP, die packaging, COB packaging, or SIP.

According to an embodiment of the present invention, the pins of the packaged flash storage chip include at least a PERST# pin, a REFCLK+ pin, a REFCLK− pin, a PETp0 pin, a PETn0 pin, a PERp0 pin, a PERn0 pin, a Power pin, and a Ground pin.

According to an embodiment of the present invention, a transmitter Tx and a receiver Rx can be constituted by at least one simplex channel at the physical layer for data transmission between the host and the flash storage chip.

According to an embodiment of the present invention, the microcontroller further includes a virtual IDE module, wherein the virtual IDE module has an IDE master port for receiving an IDE instruction and an IDE device port for executing the IDE instruction, and the virtual IDE module can be implemented by a firmware which can be executed by the microcontroller.

The present invention provides a flash array storage system which includes a plurality of flash storage chips having PCI Express interfaces. Thereby, the volume of the flash array storage system is reduced and the data transmission rate thereof is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 illustrates a standard pin specification of a PCI Express interface.

DESCRIPTION OF THE EMBODIMENTS

Figure 1:
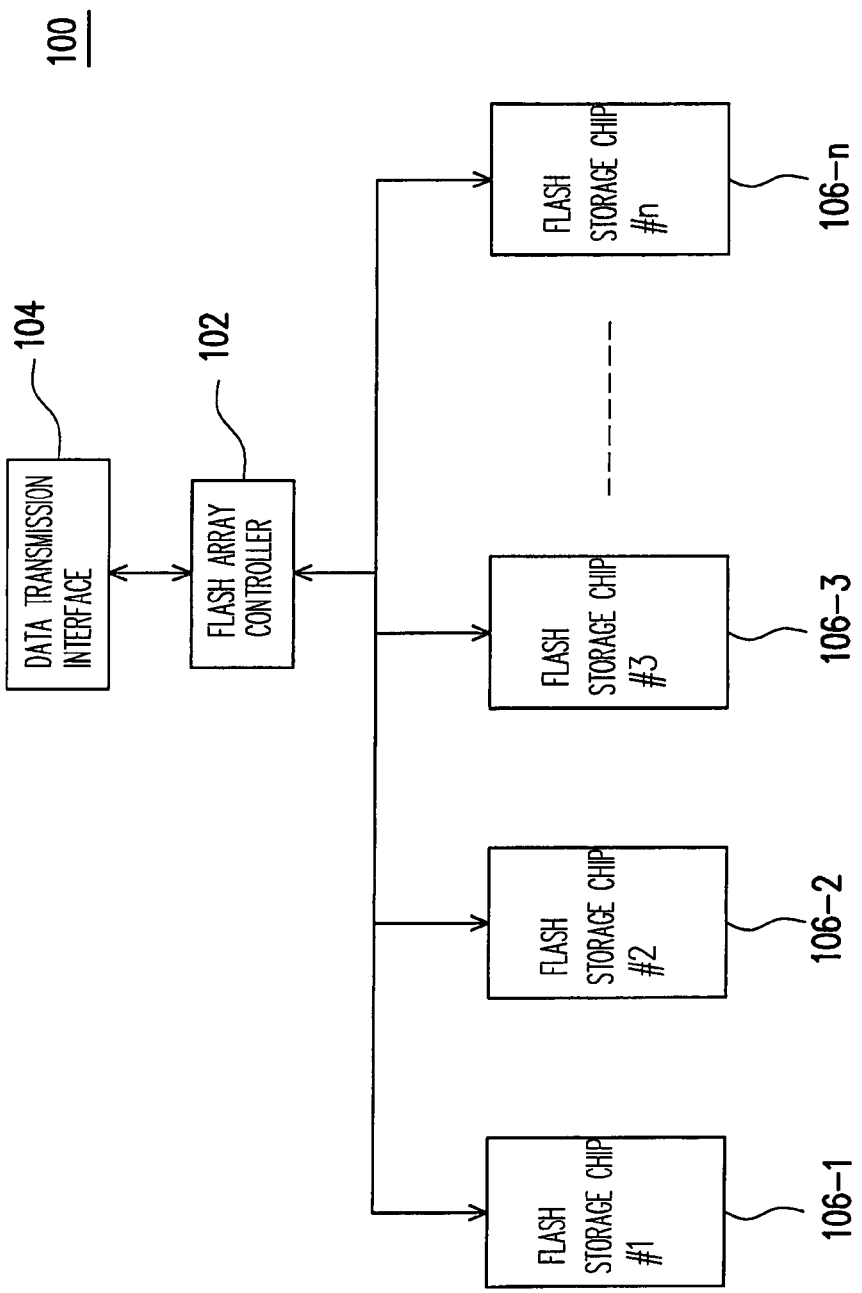
FIG. 1 is a block diagram of a flash array storage system according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Flash memory has been applied to many portable devices for replacing electrically erasable programmable read-only memory (EEPROM) or other electromagnetically powered memories due to its advantages such as low power consumption, non-volatility, vibration-proofness, and high storage density etc. Moreover, along with the advancement of semiconductor technology, the storage density and transmission speed of flash memory have been constantly improved. Thereby, in the present invention, a flash memory is used for replacing the hard disks in a redundant array of independent disks (RAID) in order to reduce the volume of the RAID.

First Embodiment

FIG. 1 is a block diagram of a flash array storage system according to the first embodiment of the present invention.

Referring to FIG. 1, the flash array storage system 100 includes a flash array controller 102, a data transmission interface 104, and a plurality of flash storage chips 106-1~106-n.

The flash array controller 102 controls the distribution of data while writing data into the flash array storage system 100 and the searching of data while reading data from the flash array storage system 100. To be specific, the flash array controller 102 deems the flash storage chips 106-1~106-n as logically continuous storage media and receives an instruction from a host (not shown) to access the flash storage chips 106-1~106-n. When the host writes a data into the flash array storage system 100, the flash array controller 102 designates at least one of the flash storage chips 106-1~106-n to write the data, and when the host reads a data from the flash array storage system 100, the flash array controller 102 searches for the flash storage chip which stores the data among the flash storage chips 106-1~106-n.

The data transmission interface 104 is coupled to the flash array controller 102 for connecting to the host, and the flash array controller 102 transmits instructions and data between the host and the flash array storage system 100 through the data transmission interface 104.

In the present embodiment, a transmitter Tx and a receiver Rx can be constituted by at least one simplex channel at the physical layer for data transmission between the flash array controller 102 and the flash storage chips 106-1~106-n.

The flash storage chips 106-1~106-n are arranged as an array and are coupled to the flash array controller 102 for storing data. The flash storage chips 106-1~106-n have the same structure, therefore only the flash storage chip 106-1 will be described herein as an example.

Figure 2:
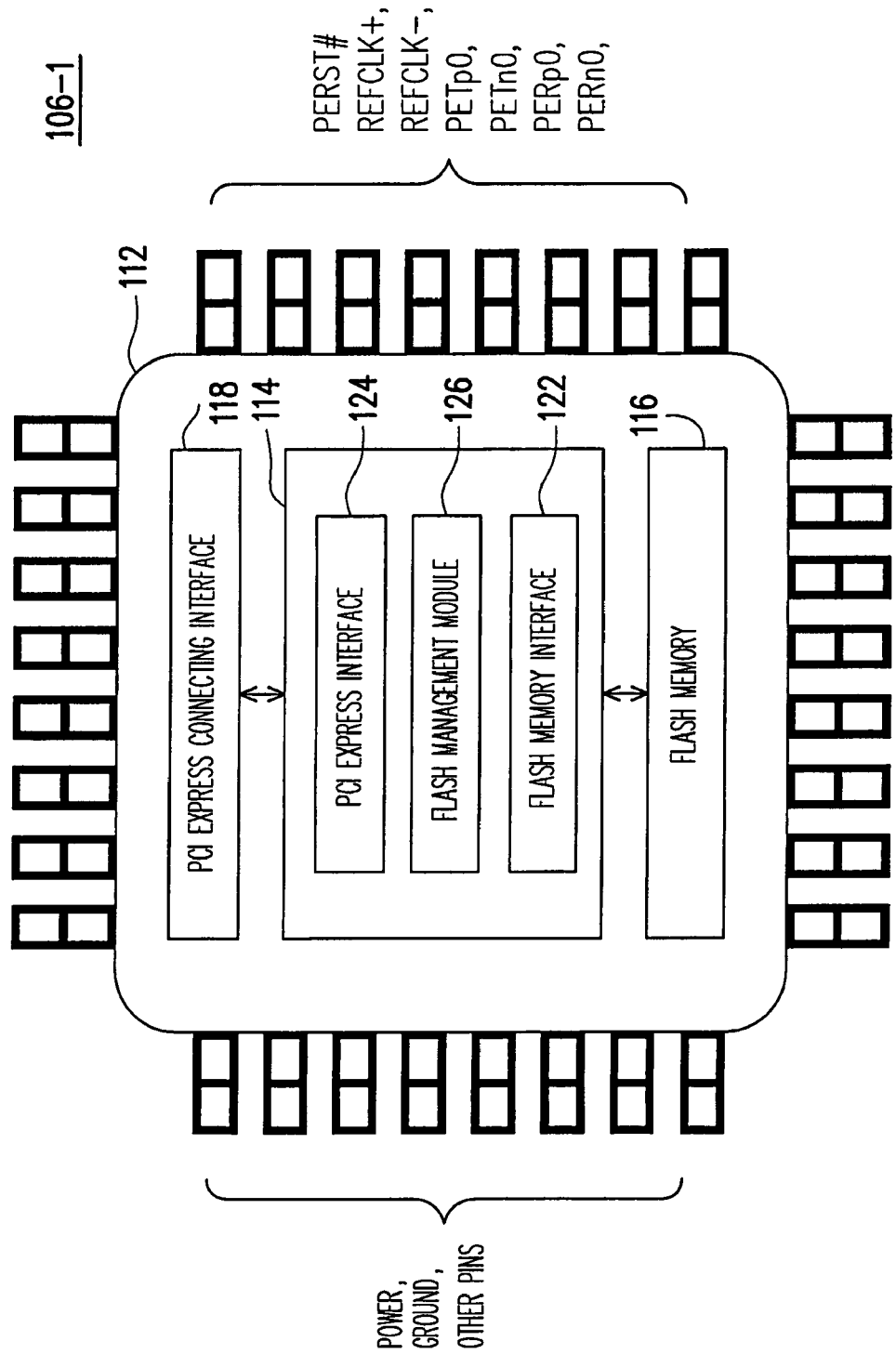
FIG. 2 is a detailed block diagram of a flash storage chip in FIG. 1.

FIG. 2 is a detailed block diagram of the flash storage chip 106-1.

Referring to FIG. 2, the flash storage chip 106-1 includes a single circuit board 112, a microcontroller 114, at least one flash memory 116, and a PCI Express connecting interface 118.

The single circuit board 112 is a substrate whereon all the components of the flash storage chip 106-1 are embedded.

The microcontroller 114 is embedded on the single circuit board 112 and is used for controlling the operation of the flash storage chip 106-1. The microcontroller 114 has a flash memory interface 122 and a PCI Express interface 124. The flash memory interface 122 is used for accessing the flash memory 116. The PCI Express interface 124 is used for converting a data into a format which is acceptable to the PCI Express connecting interface 118 so that the data can be transmitted through the PCI Express connecting interface 118. The microcontroller 114 further includes a flash management module 126 for performing flash memory block management, error correction, and power management etc. The flash memory block management function is to perform wear levelling, bad block management, and mapping table maintenance etc. In the present embodiment, the microcontroller 114 is embedded on the single circuit board 112 through quad flat no lead (QFN) packaging. However, according to the present invention, the microcontroller 114 may also be embedded on the single circuit board 112 through land grid array (LGA) packaging, ball grid array (BGA) packaging, low profile quad flat packaging (LQFP), quad flat packaging (QFP), die packaging, chip on board (COB) packaging, or system in package (SIP).

The flash memory 116 is also embedded on the single circuit board 112 and is coupled to the microcontroller 114. The flash memory 116 stores data from the host. In the present embodiment, the flash memory 116 is a single level cell (SLC) NAND flash memory. However, in another embodiment of the present invention, the flash memory 116 may also be a multi level cell (MLC) NAND flash memory. In the present embodiment, the flash memory 116 is embedded on the single circuit board 112 through QFN packaging. However, according to the present invention, the flash memory 116 may also be embedded on the single circuit board 112 through LGA packaging, BGA packaging, LQFP, QFP, die packaging, COB packaging, or SIP.

The PCI Express connecting interface 118 is also embedded on the single circuit board 112 and coupled to the microcontroller 114. The PCI Express connecting interface 118 is used for transmitting data. To be specific, the flash storage chip 106-1 includes at least a PERST# pin, a REFCLK+ pin, a REFCLK− pin, a PETp0 pin, a PETn0 pin, a PERp0 pin, a PERn0 pin, a Power pin, and a Ground pin according to the specification of the PCI Express interface (as shown in FIG. 5).

In the present embodiment, when the host writes a data into the flash array storage system 100, the flash array controller 102 receives an instruction from the host and divides the data into a plurality of portions to be evenly transmitted into at least one of the flash storage chips 106-1~106-n. The microcontroller 114 of the flash storage chip which receives the data portion receives the data portion through the PCI Express connecting interface 118 and the PCI Express interface 124 and stores the data into the flash memory 116 through the flash memory interface 122.

In the present embodiment, when the host reads a data from the flash array storage system 100, the flash array controller 102 searches for the data according to an instruction issued by the host, and the microcontroller 114 of at least one flash storage chip which stores the data reads the data from the flash memory 116 through the flash memory interface 122 and transmits the data to the host through the PCI Express interface 124 and the PCI Express connecting interface 118. In other words, the data received through the PCI Express connecting interface is converted into a format acceptable to the flash memory through the flash memory interface, and the data read from the flash memory is converted into a format acceptable to the PCI Express connecting interface through the PCI Express interface.

In the present embodiment, the flash storage chips 106-1~106-n are packaged as a single chip so that the volume of the entire flash array storage system 100 is reduced and accordingly the flash array storage system 100 can be applied to a small computer system. Moreover, in the present embodiment, the external transmission interfaces of the flash storage chips 106-1~106-n are the PCI Express interfaces, and the transmission rate thereof is up to 250 MB/s at a 1 lane simplex channel (PCIe x1). Accordingly, in the present embodiment, the data transmission rate of the flash array storage system can be effectively improved.

Second Embodiment

Figure 3:
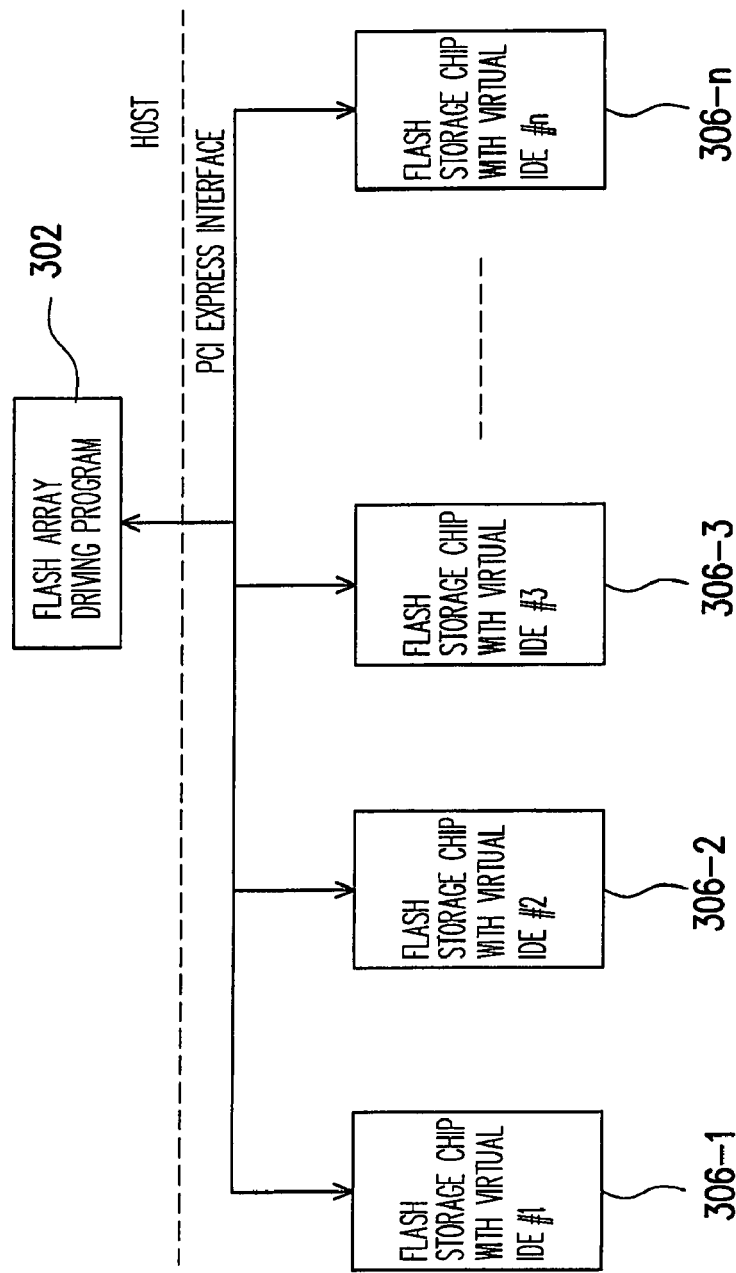
FIG. 3 is a block diagram of a flash array storage system according to a second embodiment of the present invention.

FIG. 3 is a block diagram of a flash array storage system according to the second embodiment of the present invention.

Referring to FIG. 3, the flash array storage system 300 includes a flash array driving program 302 and a plurality of flash storage chips 306-1~306-n.

The flash array driving program 302 is executed by a host (not shown) for controlling the distribution of data while writing data into the flash array storage system 300 and the searching of data while reading data from the flash array storage system 300. To be specific, the flash array driving program 302 deems the flash storage chips 306-1~306-n logically continuous storage media and receives an instruction from the host to access the flash storage chips 306-1~306-n. When the host writes a data into the flash array storage system 300, the flash array driving program 302 designates at least one of the flash storage chips 306-1~306-n to write the data, and when the host reads a data from the flash array storage system 300, the flash array driving program 302 searches for the flash storage chip which stores the data among the flash storage chips 306-1~306-n.

The flash storage chips 306-1~306-n are arranged as an array and are coupled to the host for storing data. The flash storage chips 306-1~306-n have the same structure, therefore only the flash storage chip 306-1 will be described herein as an example.

Figure 4:
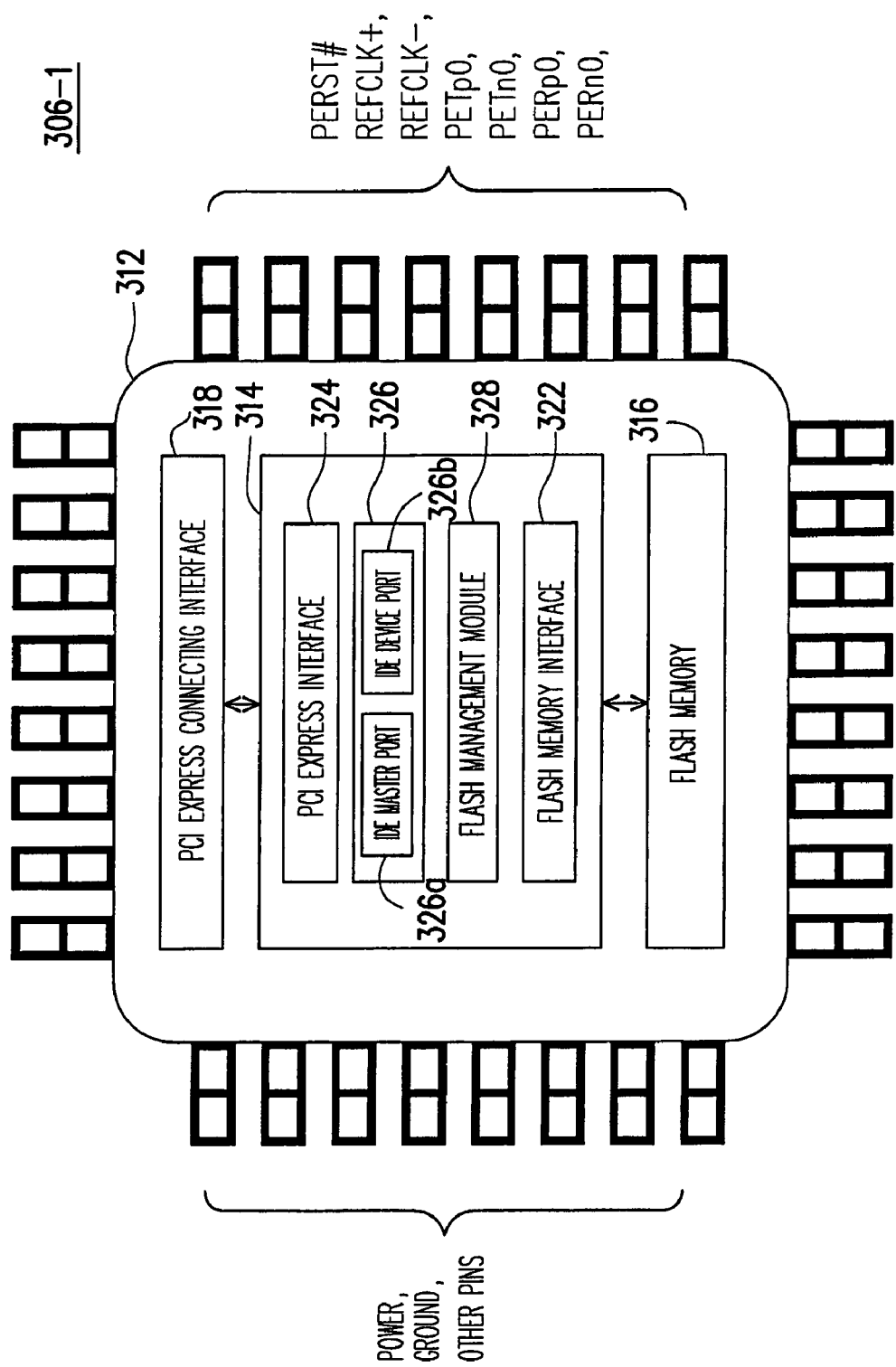
FIG. 4 is a detailed block diagram of a flash storage chip in FIG. 3.

FIG. 4 is a detailed block diagram of the flash storage chip 306-1.

Referring to FIG. 4, the flash storage chip 306-1 includes a single circuit board 312, a microcontroller 314, at least one flash memory 316, and a PCI Express connecting interface 318.

The single circuit board 312 is a substrate whereon all the components of the flash storage chip 306-1 are embedded.

The microcontroller 314 is embedded on the single circuit board 312 and is used for controlling the operation of the flash storage chip 306-1. The microcontroller 314 has a flash memory interface 322, a PCI Express interface 324, and a virtual IDE module 326. The flash memory interface 322 is used for accessing the flash memory 316. The PCI Express interface 324 is used for converting a data into a format acceptable to the PCI Express connecting interface 318 so that the data can be transmitted through the PCI Express connecting interface 318. The virtual IDE module 326 has an IDE master port 326a for receiving an IDE instruction and an IDE device port 326b for executing the IDE instruction. In the present invention, the virtual IDE module 326 is implemented by a firmware which can be executed by the microcontroller 314. The microcontroller 314 further includes a flash management module 328 for performing flash memory block management (such as wear levelling, bad block management, and mapping table maintenance), error correction, and power management etc.

In the present embodiment, the microcontroller 314 is embedded on the single circuit board 312 through QFN packaging. However, the microcontroller 314 may also be embedded on the single circuit board 312 through LGA packaging, BGA packaging, LQFP, QFP, die packaging, COB packaging, or SIP.

The flash memory 316 is also embedded on the single circuit board 312 and is coupled to the microcontroller 314. The flash memory 316 stores data from the host. In the present embodiment, the flash memory 316 is a SLC NAND flash memory. However, in another embodiment of the present invention, the flash memory 316 may also be a MLC NAND flash memory. Besides, in the present embodiment, the flash memory 316 is embedded on the single circuit board 312 through QFN packaging. However, the flash memory 316 may also be embedded on the single circuit board 312 through LGA packaging, BGA packaging, LQFP, QFP, die packaging, COB packaging, or SIP.

The PCI Express connecting interface 318 is also embedded on the single circuit board 312 and coupled to the microcontroller 314 for transmitting data. To be specific, the flash storage chip 306-1 includes at least a PERST# pin, a REFCLK+ pin, a REFCLK– pin, a PETp0 pin, a PETn0 pin, a PERp0 pin, a PERn0 pin, a Power pin, and a Ground pin according to the specification of the PCI Express interface (as shown in FIG. 5).

In the present embodiment, when the flash array storage system 300 is in operation, the host executes the flash array driving program 302, and the microcontroller 314 notifies the host that the flash storage chips 306-1~306-n are IDE storage devices.

Accordingly, when the host reads a data from the flash array storage system 300, the flash array driving program 302 searches for the data according to a read instruction, for example, an IDE instruction, issued by the host and transmits the IDE instruction to at least one of the flash storage chips 306-1~306-n which stores the data. After that, the virtual IDE module 326 of the flash storage chip which stores the data executes the IDE instruction, and the microcontroller 314 of the flash storage chip which stores the data reads the data from the flash memory 316 through the flash memory interface 322 according to the IDE instruction, and the data is converted into a format acceptable to the PCI Express connecting interface 318 through the PCI Express interface 324 to be transmitted to the host.

When the host writes a data into the flash array storage system 300, the flash array driving program 302 receives a write instruction, for example, an IDE instruction, from the host, and the flash array driving program 302 divides the data into a plurality of portions and transmits the divided data portion and the IDE instruction together to at least one of the flash storage chips 306-1~306-n. After that, the flash storage chip which has received the IDE instruction and the data executes the IDE instruction, and the data is converted into a format acceptable to the flash memory 316 through the flash memory interface 322 to be written into the flash memory 316.

In the present embodiment, the IDE instruction is compatible to ATA specification.

In another embodiment of the present invention, the IDE instruction is compatible to serial ATA specification.

In the present embodiment, the flash storage chips 306-1~306-n are packaged as a single chip so that the volume of the entire flash array storage system 300 is reduced and accordingly the flash array storage system 300 can be applied to a small computer system. Moreover, in the present embodiment, the external transmission interfaces of the flash storage chips 306-1~306-n are PCI Express interfaces, and the transmission rate thereof is up to 250 MB/s at a 1 lane simplex channel (PCIe x1). Accordingly, in the present embodiment, the data transmission speed of the flash array storage system can be effectively improved. Particularly, in the present embodiment, the microcontroller has a virtual IDE module such that the host can access the flash array storage system 300 up to the speed of the PCI Express interface and the microcontroller can have IDE compatibility. Accordingly, data can be transmitted through the PCI Express interface without an extra PCI Express driver of the host system.

Figure 6:
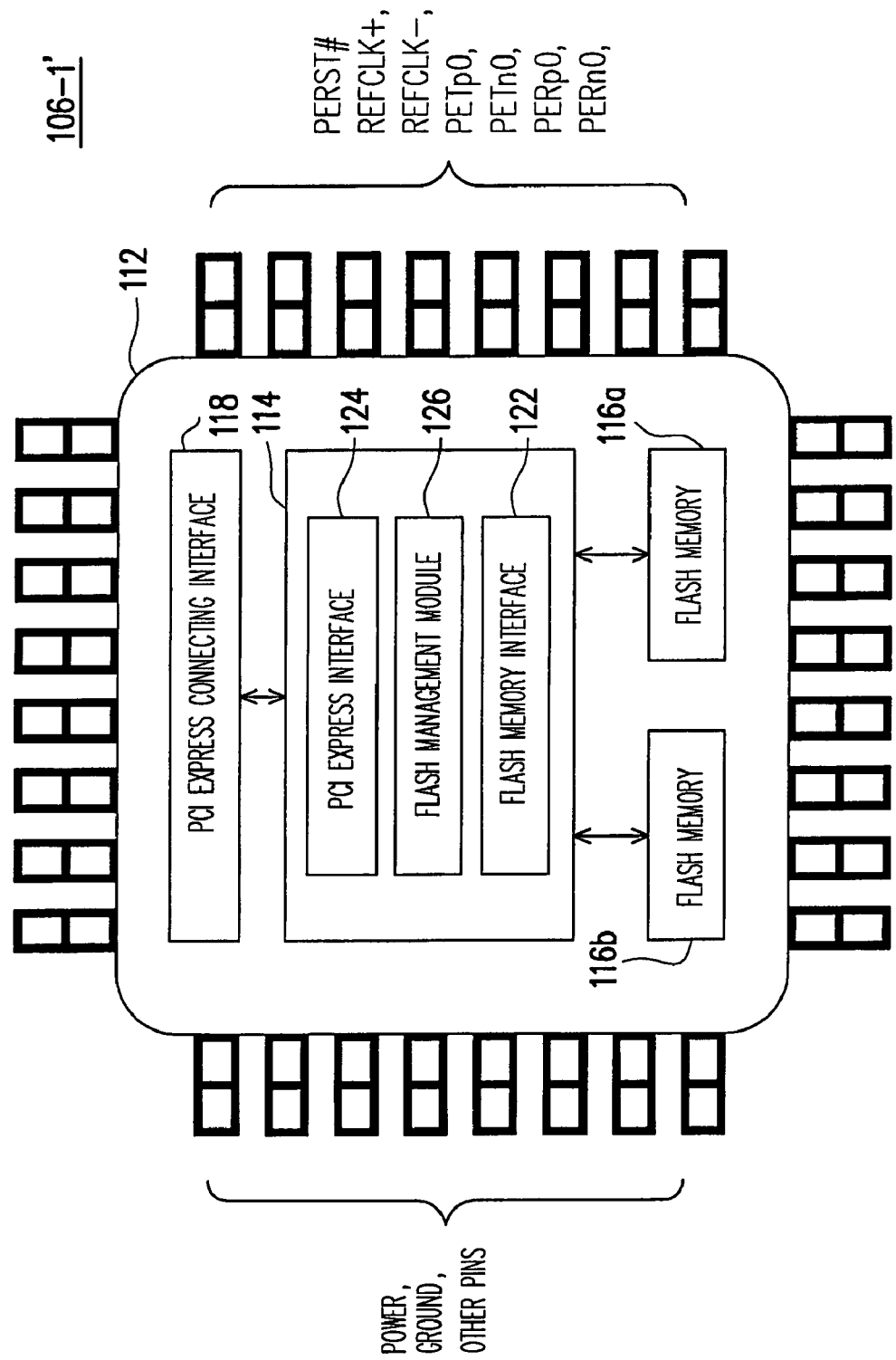
FIG. 6 is a detailed block diagram of a flash storage chip according to an embodiment of the present invention.

It should be mentioned that when the flash storage chip in the first and the second embodiment of the present invention is embedded with a plurality of flash memories, these flash memories are electrically connected to the microcontroller in a parallel manner (as shown in FIG. 6).

FIG. 6 is a detailed block diagram of a flash storage chip according to an embodiment of the present invention. Referring to FIG. 6, the components in FIG. 6 are the same as those illustrated in FIG. 2 therefore will not be described herein. The difference between the two embodiments is that the flash storage chip 106-1' in FIG. 6 has two flash memories 116a and 116b. Besides, the flash memories 116a and 116b are electrically connected to the microcontroller 114 in parallel, thereby increasing the speed of data transmission through parallel processing. The same concept can be applied to the embodiment illustrated in FIG. 4.

In foregoing embodiments of the present invention, the flash array storage system provided by the present invention is implemented with a plurality of flash storage chips. However, the flash storage chip provided by the present invention has a complete structure of storage device so the flash storage can be used as an independent storage device in another embodiment of the present invention. For example, the flash storage chip in the present invention can be directly embedded on a motherboard as the storage device of a computer for replacing the hard disk in the computer, thereby reducing the volume of the computer. Or, the flash storage chip may also be applied to an embedded system, such as a cell phone, a personal digital assistant (PDA), a global positioning system (GPS), a set-top-box, or an embedded server etc, to reduce the volume of the embedded system.

In summary, the present invention provides a flash storage chip and a flash array storage system. The flash storage chip is packaged as a single chip so that the volume of the entire flash array storage system is reduced and accordingly the flash array storage system can be applied to a small computer system. Moreover, a PCI express interface is adopted as the external transmission interface of the flash storage chip such that the data transmission rate of the flash array storage system is effectively improved. Furthermore, a virtual IDE module is adopted in the present invention so that the flash array storage system in the present invention can be accessed by a host in the speed of the PCI express interface and can have IDE compatibility.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash array storage system, comprising:
a plurality of flash storage chips, arranged as an array, each of the flash storage chips comprising:
a single circuit board;
a microcontroller, embedded on the single circuit board and having a flash memory interface, a PCI Express interface, and a virtual integrated device electronics (IDE) module, the virtual IDE module having an IDE master port for receiving an IDE instruction and an IDE device port for executing the IDE instruction, the virtual IDE module being implemented by a firmware which can be executed by the microcontroller;

at least one flash memory, embedded on the single circuit board and coupled to the microcontroller for storing data; and a PCI Express connecting interface, embedded on the single circuit board and coupled to the microcontroller for connecting to a host; and a flash array driving program, installed in the host and executed by the host for controlling data access to the flash storage chips;

wherein when the host writes a data into the flash array storage system, the flash array driving program designates at least one of the flash storage chips to write the data and records designating information and the virtual IDE module of the designated flash storage chip receives and executes the IDE instruction issued by the host, and the data is received by the PCI Express connecting interface and the PCI Express interface and converted into formats acceptable to the flash memories by the flash memory interfaces to be written into the flash memories, wherein when the host reads the data from the flash array storage system, the flash array driving program searches for the flash storage chip which stores the data based on the designating information, and the virtual IDE module of the flash storage chip which stores the data receives and executes the IDE instruction issued by the host, and the data is read by the flash memory interfaces and converted into formats acceptable to the PCI Express connecting interfaces by the PCI Express interfaces to be transmitted.

2. The flash array storage system according to claim 1, wherein the at least one flash memory in each of the flash storage chips is a SLC NAND flash memory or a MLC NAND flash memory.

3. The flash array storage system according to claim 1, wherein the microcontroller and the at least one flash memory in each of the flash storage chips are embedded on the single circuit board through QFN packaging, LGA packaging, BGA packaging, LQFP, QFP, die packaging, COB packaging, or SIP.

4. The flash array storage system according to claim 1, wherein the IDE instruction is compatible to ATA specification or serial ATA specification.

5. A flash storage chip, comprising:
a single circuit board;
a microcontroller, embedded on the single circuit board and having a flash memory interface, a PCI Express interface, and a virtual IDE module, the virtual IDE module having an IDE master port for receiving an IDE instruction and an IDE device port for executing the IDE instruction, the virtual IDE module being implemented by a firmware which can be executed by the microcontroller;
at least one flash memory, embedded on the single circuit board and coupled to the microcontroller for storing data; and
a PCI Express connecting interface, embedded on the single circuit board and coupled to the microcontroller for coupling the flash storage chip to the host,
wherein when the host reads a data from the flash memory, the IDE instruction issued by the host is transmitted to the virtual IDE module to be executed by the virtual IDE module, and the data is read from the flash memory through the flash memory interface and converted into a format acceptable to the PCI Express connecting interface through the PCI Express interface to be transmitted to the host,
wherein when the host writes a data into the flash memory, the IDE instruction issued by the host is transmitted to the virtual IDE module to be executed by the virtual IDE module, and the data is received through the PCI Express interface and converted into a format acceptable to the flash memory through the flash memory interface to be written into the flash memory.

6. The flash storage chip according to claim 5, wherein the at least one flash memory is a SLC NAND flash memory or a MLC NAND flash memory.

7. The flash storage chip according to claim 5, wherein the microcontroller and the at least one flash memory are embedded on the single circuit board through QFN packaging, LGA packaging, BGA packaging, LQFP, QFP, die packaging, COB packaging, or SIP.

8. The flash storage chip according to claim 5, wherein the IDE instruction is compatible to ATA specification or serial ATA specification.

9. A flash storage chip, comprising:
a single circuit board;
a microcontroller, embedded on the single circuit board and having a flash memory interface and a PCI Express interface;
a plurality of flash memories, embedded on the single circuit board and respectively coupled to the microcontroller for storing data; and
a PCI Express connecting interface, embedded on the single circuit board and coupled to the microcontroller for coupling the flash storage chip to a host,
wherein when the host writes a data into the flash storage chip, the microcontroller receives the data through the PCI Express interface and writes the data into the flash memories through the flash memory interface,
wherein when the host reads a data from the flash storage chip, the microcontroller reads the data from the flash memories through the flash memory interface and transmits the data to the host through the PCI Express interface and the PCI Express connecting interface,
wherein the data is read from or written into the flash memories in a parallel manner,
wherein the microcontroller further comprises a virtual IDE module, the virtual IDE module has an IDE master port for receiving an IDE instruction and an IDE device port for executing the IDE instruction, and the virtual IDE module is implemented by a firmware which can be executed by the microcontroller.

10. The flash storage chip according to claim 9, wherein each of the flash memories is a SLC NAND flash memory or a MLC NAND flash memory.

11. The flash storage chip according to claim 9, wherein the microcontroller and the flash memories are embedded on the single circuit board through QFN packaging, LGA packaging, BGA packaging, LQFP, QFP, die packaging, COB packaging, or SIP.

12. The flash storage chip according to claim 11, wherein the pins of the packaged flash storage chip comprise at least a PERST# pin, a REFCLK+ pin, a REFCLK− pin, a PETp0 pin, a PETn0 pin, a PERp0 pin, a PERn0 pin, a Power pin, and a Ground pin.

13. The flash storage chip according to claim 9, wherein a transmitter Tx and a receiver Rx are constituted by at least one simplex channel at a physical layer for data transmission between the host and the flash storage chip.

* * * * *